United States Patent [19]

Wigfall

[11] 3,707,857
[45] Jan. 2, 1973

[54] MULTI-PURPOSE SENSOR ASSEMBLY FOR AUTOMATIC WASHER

[75] Inventor: Robert T. Wigfall, St. Joseph, Mich.

[73] Assignee: Whirlpool Corporation, Benton Harbor, Mich.

[22] Filed: Sept. 20, 1971

[21] Appl. No.: 181,891

[52] U.S. Cl. .................................................68/12 R
[51] Int. Cl. ..............................................D06f 33/02
[58] Field of Search..............................68/12 R, 12 F

[56] References Cited

UNITED STATES PATENTS

| | | | |
|---|---|---|---|
| 3,184,932 | 5/1965 | Cobb et al. | 68/12 FA |
| 3,358,161 | 12/1967 | Claiborne | 68/12 R |
| 3,388,566 | 6/1968 | Kaper et al. | 68/12 R |
| 3,464,673 | 9/1969 | Cargo et al. | 68/12 R |
| 3,477,258 | 11/1969 | Walker et al. | 68/12 |

FOREIGN PATENTS OR APPLICATIONS

| | | | |
|---|---|---|---|
| 1,209,052 | 10/1970 | Great Britain | 68/12 R |
| 1,221,332 | 2/1971 | Great Britain | 68/12 R |

Primary Examiner—William I. Price
Attorney—James S. Nettleton et al.

[57] ABSTRACT

A sensing system for a laundry appliance includes a pair of temperature responsive devices, heating means, and a thermally conductive disk which places one of the temperature responsive devices in good heat-flow relationship with the heating means and the washing fluid. The sensing system includes associated switching and biasing circuitry which enables the system to be used to sense a variety of machine functions.

8 Claims, 4 Drawing Figures

PATENTED JAN 2 1973  3,707,857

MULTI-PURPOSE SENSOR ASSEMBLY FOR AUTOMATIC WASHER

BACKGROUND OF THE INVENTION

1. Field of the Invention

The invention relates generally to sensing systems for automatic washers, and in particular to a sensor assembly and associated circuitry for sensing in sequential fashion a plurality of conditions within a washer and producing a signal indicative of the state of the condition sensed.

2. Description of the Prior Art

It is generally known that sensing means can be employed on automatic washing machines to sense various machine operations for purposes of control. For example, U. S. Pat No. 3,184,932, assigned to the assignee of the present application, describes a sensor assembly which can be used to sense the end of an extraction operation. U. S. Pat. No. 3,388,566 discloses a control circuit for an automatic washer which includes means for sensing the temperature of the wash water and an associated switch which allows a variety of temperatures to be selected. However, these and other prior art sensing arrangements suffer from a common problem in that they provide a means for sensing only a single machine function, with the attendant requirement for additional separate sensor assemblies and circuitry if other functions are to be sensed.

SUMMARY OF THE INVENTION

The invention relates to a sensing system which can be used with various types of appliance controls such as for example, electromechanical timers; however, it is particularly suited for use with electronic sequential appliance controls of the type which utilize an indexing signal to advance the control circuit through a sequence of states which correspond to a program of washer operations.

The sensor assembly includes two interconnected temperature responsive devices, heating means, and a member placing one of the temperature responsive devices and the heating means in thermal association with each other and with the washing fluid. These components are contained within a housing which is mounted adjacent the bottom of the clothes washing receptacle. The individual components of the sensor assembly are electrically connected to a circuit which includes biasing means for the temperature responsive devices and a plurality of switches which control the power supplied to the heating means and to the temperature responsive devices. The switches are generally controlled by the main washer control circuit with which the sensor system cooperates but, if desired, these switches may be also controlled by the operator of the appliance. Utilizing the switches to selectively alter the energization of the heating means and temperature responsive devices, it is possible to sense a variety of machine conditions such as end-of-spin, end-of-drain, end-of-cooldown, and water temperature, while employing only a single sensor assembly.

Also included in the circuitry associated with the sensor assembly are an amplifier circuit for amplifying the signals produced by the temperature responsive devices and a trigger circuit connected to the amplifier output for producing a signal which rapidly changes state in response to a predetermined output from the amplifier. The digital signal thus produced by the trigger circuit may be conveniently employed as an indexing signal when the sensing system is used in conjunction with an appliance control which is of the electronic sequential type.

It is therefore an object of the invention to provide a single sensor assembly and an associated circuit which permit a variety of conditions within an automatic washer to be sensed for purposes of controlling the appliance. It is a further object of the invention to provide a sensor of the aforementioned type which is not sensitive to changes in ambient temperature or fluctuations in the supply voltage from which the sensor assembly is operated. Additional objects and advantages of the invention will become apparent upon reading the description of the preferred embodiment thereof.

DESCRIPTION OF THE PREFERRED EMBODIMENT

Figure 1:
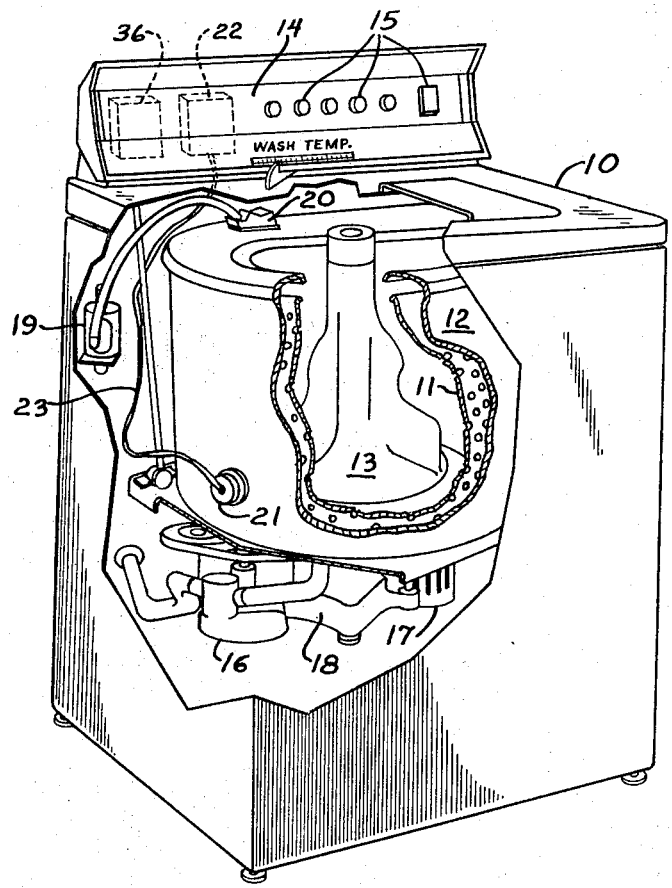
FIG. 1 is a fragmentary perspective view of an automatic washer employing the invention.

In accordance with a preferred embodiment of the invention as illustrated by the drawings, an automatic washer seen generally at 10 includes a perforate clothes receptacle or basket 11, a substantially imperforate casing or tub 12 which surrounds the basket 11, and an upstanding agitator 13 centrally disposed within the basket 11. A console 14 is provided which houses an appropriate number of switches illustrated generally at 15 by which the operator may select or modify various aspects of a washing operation as is common practice. A pump 16 is provided to recirculate and remove laundry liquid from the tub 12. Pump 16 is driven by a motor 17 which acts through an appropriate transmission 18 to oscillate the agitator 13 during agitation and spin the basket 11 during extraction operations. A water inlet assembly 19 is provided which includes electrically operated valves for independently controlling the flow of hot and cold water through siphon break 20 and into the tub 12.

A sensor assembly 21 is mounted within a suitable aperture in the side of the tub 12. The sensor assembly 21 is connected to an associated sensing and switching circuit 22 by means of a plurality of connections indicated in FIG. 1 by cable 23.

Figure 2:
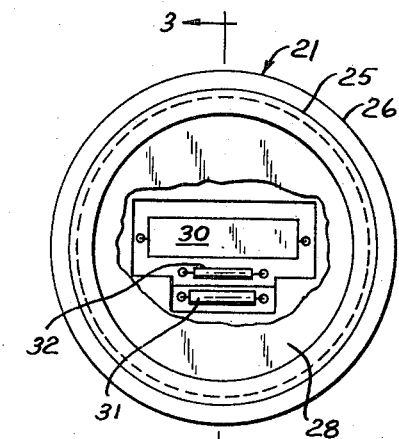
FIG. 2 is a front elevation of the sensor assembly used to practice the invention.
Figure 3:
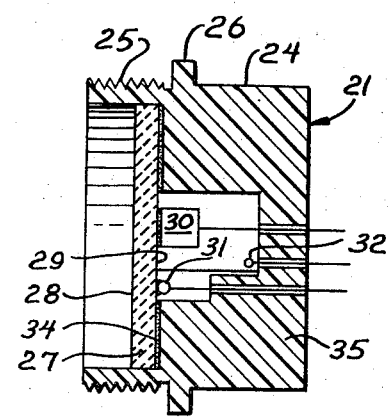
FIG. 3 is a cross section substantially along line 3—3 of FIG. 2.

Referring to FIGS. 2 and 3, the sensor assembly 21 is illustrated in detail. The sensor components are contained within a cylindrical housing 24 which is made of a material having low thermal and electrical conductivity. By way of example, polypropylene or rubber may be used to fabricate the housing 24. A section 25 of the outer surface of cylindrical housing 24 is threaded from a point adjacent one end of the housing 24 to a circumferential shoulder 26. The shoulder 26 serves to limit the distance to which housing section 25 may be inserted through the mounting aperture in the side of tub 12. To secure the sensor assembly in place, either the aperture within the tub 12 may be threaded to receive the threaded housing section 25 or appropriate threaded locking means may be tightened against the inner wall of the tub 12. Liquid sealing means such as a resilient washer (not shown) may be employed if necessary on one or both sides of the aperture within the tub 12. A disk-like member 27 forms a front surface of the sensor assembly 21, and is constructed of a material having good electrical insulating properties. Also, the material used to construct member 27 should have a moderate or low thermal time constant, as will be discussed later. Again by way of example, the disk member 27 may be fabricated of ceramic material or an epoxy resin.

When the sensor assembly 21 is installed in the tub 12, the front surface 28 of the disk-like member 27 will contact washing fluid whenever the tub 12 is filled to a sufficient level. Inasmuch as it is desirable to have member 27 contact the washing fluid in the tub 12, and further to have fluid thrown from the clothes load during the final portion of an extraction operation also contact the front surface 28 of member 27, the sensor assembly 21 is located in the side wall of the tub 12 adjacent the lower side portion of the perforate basket 11. The specific location of the sensor assembly 21 is to some degree a function of the location of the perforations in the basket 11. However, in general the sensor assembly 21 is located adjacent the lower portion of the basket 11 because during an extraction operation the clothes load usually forms an annular ring about the lower portion of the basket wall, such that during the final portion of an extraction operation fluid is thrown only from the perforations located about this area of the basket.

Mounted to the rear surface 29 of disk member 27 are the heating means 30 and a first temperature responsive device 31. These components may be secured in place by means of a thermally conductive adhesive or by the use of appropriate hardware. The heating means 30 and the temperature responsive device 31 are thus in good thermal association with the member 27 but not in direct thermal association with each other. A second temperature responsive device 32 is located within the interior of the housing 24 but is not in direct contact with either the heating means 30, the disk member 27, or the first temperature responsive device 31.

In practice, the heating means 30 may comprise a conventional power resistor, preferably having a relatively large rectangular surface area to enable good heat transfer to the disk member 27. The first and second temperature responsive devices may comprise thermistors having a negative temperature coefficient. The disk member 27 may be secured in place by any suitable means such as an adhesive acting between its rear surface 29 and a surface 34 of body portion 35 of the housing 24. The electrical connections for the heater and for the thermistors may be brought out through the rear housing surface 33 by means of appropriately spaced holes in the housing body 35.

Figure 4:
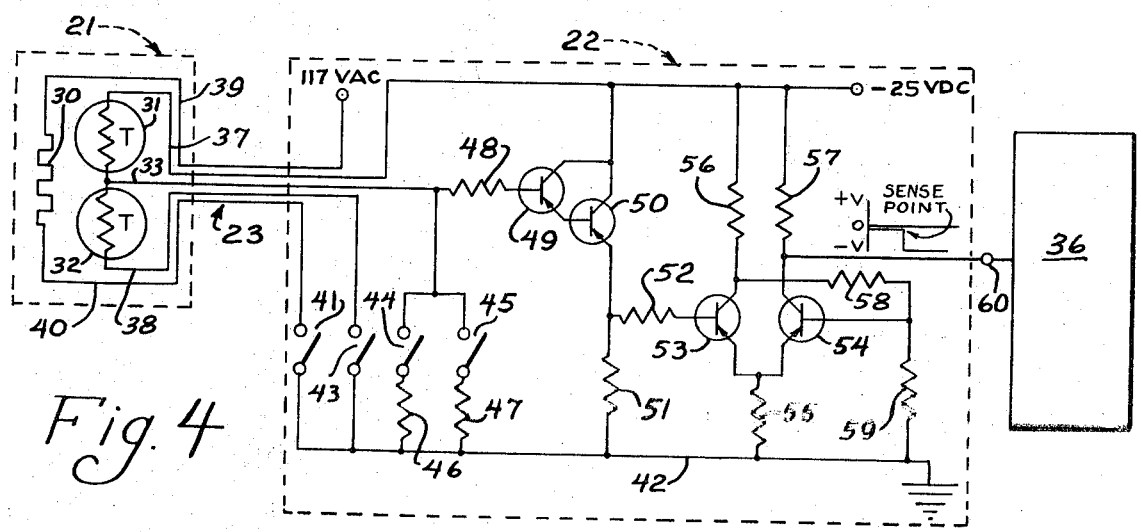
FIG. 4 illustrates the switching and signal processing circuit used in association with the sensor assembly.

FIG. 4 illustrates the sensing and switching circuit 22 which operates in conjunction with the components of the sensor assembly 21 to produce signals which are related to the condition being sensed and which may be used to sequence the appliance control circuit illustrated generally at 36 through a program of machine operations. The particular embodiment of the sensing and switching 22 illustrated is designed to operate with a negative 25 volt DC supply voltage. It will be appreciated by those skilled in the art that other DC supply voltages can also be used, the particular voltage used being generally determined by the type of electronic control circuit with which the instant circuit interfaces.

Examples of electronic sequential appliance control circuits of the type with which the instant sensing system can conveniently be used can be seen with reference to U. S. Pat. Nos. 3,464,673 or 3,477,258, which are assigned to the assignee of the present application. Both of these patents disclose electronic sequential control circuits for domestic appliances which require indexing signals to sequence the circuit from one state to a subsequent state.

The electrical configuration of the sensor assembly 21 is shown to comprise the heater 30, the first thermistor 31, and the second thermistor 32 which is electrically connected at one end to thermistor 31. A lead 33 connects to the common terminals of thermistors 31 and 32 and is brought out of the sensor assembly 21 along with a lead 37 which connects the −25 volt DC supply to thermistor 31, a lead 38 which is connected to the remaining terminal of thermistor 32, lead 39 which supplies 117 volts AC to a first terminal of the heater 30, and a lead 40 which is connected to the remaining end of the heater 30. Leads 33 and 37 through 40 form the electrical cable 23 which connects sensor assembly 21 with the sensing and switching circuit 22. Within the circuit 22, lead 40 connects with switch 41, which when closed connects lead 40 to the circuit ground 42. Lead 38 is likewise connected to a switch 43 which when closed provides a ground connection. Lead 33 is connected to a pair of switches 44 and 45 which provide ground connections through resistors 46 and 47 respectively. Lead 33 also connects to a resistor 48 which serves as the input resistor for an amplifier circuit formed by transistors 49 and 50. The output of the amplifier is developed across resistor 51 and is supplied through a resistor 52 to a Schmitt trigger circuit comprising transistors 53 and 54, and resistors 55 through 59. The output of the Schmitt trigger circuit is provided on lead 60 which connects to the indexing input of the appliance control circuit 36.

The switches 41, 43, 44 and 45 along with resistors 46 and 47 operate to alter the biasing and electrical configuration of the components within the sensor assembly 21. In particular, the resistive heater 30 will only be energized by the 117 volt AC potential supplied on lead 39 when lead 40 is connected to ground through switch 41. When switch 43 is closed, thermistors 31 and 32 are placed in series across the −25 volt DC supply. When connected in this fashion, thermistors 31 and 32 form a voltage divider and the signal developed at lead 33 will be the function of the temperature of each thermistor. Whenever switch 43 is open, thermistor 32 is electrically disconnected and thermistor 31 serves as the single temperature responsive sensing element. Switches 44 and 45 connect resistors 46 and 47 to lead 33 respectively, and are utilized to set the desired DC operating point for thermistor 31 when switch 43 is open. When switch 43 is closed the operating point for both thermistors 31 and 32 is determined by the state of switches 44 and 45.

If as in the present embodiment negative temperature coefficient thermistors are used, an increase in the temperature of disk member 27 will cause the voltage on lead 33 to decrease toward the negative supply voltage. This is true regardless of the states of the aforementioned switches. As the voltage on lead 33 decreases, the amplifier circuit comprising transistors 49 and 50 causes a corresponding increase in current through resistor 51. Due to the resulting increase voltage drop across resistor 51 the voltage supplied to transistor 53 through resistor 52 likewise decreases. Once the voltage supplied to transistor 53 decreases to a predetermined level, the output on lead 60 of the Schmitt trigger circuit will rapidly change state in accordance with the well-known operation of such trigger circuits. For the Schmitt trigger shown, transistor 53 will be held off until some predetermined negative voltage is reached at its base. Whenever transistor 53 is off, the voltage divider formed by resistors 56, 58 and 59 biases transistor 54 into conduction such that the voltage is at its collector, and therefore the voltage on output lead 60 is nearly zero. Whenever an amplified sensor signal triggers transistor 53 into conduction, transistor 54 will be switched out of conduction producing a voltage at its collector which is nearly equal to the negative supply voltage. Thus, the circuit illustrated produces a negative going step-like voltage change on output lead 60 whenever the sensor signal on lead 33 swings through some predetermined threshold level.

The switches 41, 43, 44 and 45 are preferably controlled by the main control circuit 36 and may be mechanically operated switches or solid state switches. Solid state switches are easily operated by electronic controls of the aforementioned type, and the switching sequence may be arranged such that each state of the main control circuit which corresponds to a machine operation to be sensed results in a different setting of the aforementioned switches to thereby achieve the desired configuration. For example, to sense the point at which an extraction operation should be terminated, switches 41, 43 and 44 are closed while switch 45 remains open. With the switches set in this manner, 117 volts AC is supplied to the resistive heater 30, thermistors 31 and 32 are placed in series across the DC power supply, and resistor 46 is connected from lead 33 to circuit ground. The heater 30 is chosen such that it tends to heat the disk 27 to a temperature in the vicinity of 212° (a temperature at or slightly above the boiling point of the washing fluid is desired). Inasmuch as thermistor 31 is in good heat flow relationship with disk 27, the temperature of this thermistor will rapidly track that of the disk 27. The temperature of thermistor 32 will track that of the heater 30 and the disk 27 but will lag the temperature of these elements due to a slower heat transfer resulting from the location of thermistor 32. Thus, the temperature of thermistor 32 will not vary appreciably in response to short term or rapid changes in temperature of the heater 30 and the disk 27. The lagging temperature response of thermistor 32 enables it to be used as a means for compensating the sensor system for long term changes in heat output from the heater 30. Such changes may result from shifts in the amplitude of the AC supply voltage or gradual changes in the heat output of the heater 30 during its life.

During an extraction operation, washing fluid (generally water) from the clothes passes through the lower perforations of the clothes basket 11 and is thrown against the front surface 28 of disk 27. During all but the final portion of an extraction operation, the amount of water thrown against surface 28 is sufficient to cool the disk 27 and prevent its temperature from rising to its steady state value near 212°. As the extraction operation proceeds, progressively smaller amounts of water are extracted from the clothes load and thrown against the surface 28 in a given time increment, thus allowing the temperature of disk 27 to increase. The increase in the temperature of disk 27 causes the resistance of thermistor 31 to decrease, which in turn causes the voltage on lead 33 to decrease toward the negative supply voltage. Once the voltage on lead 33 decreases to a preselected level the amplifier and trigger circuits operate as previously described to produce a step-like decrease in the voltage present on output lead 60. The voltage change on output lead 60 corresponds to a particular temperature of disk 27 which is in turn related as previously described to the degree of extraction. The signal change on output lead 60 may be subsequently utilized to index the main washer control circuit 36 to terminate the extraction operation and, if desired, initiate some other machine operation.

The voltage present on output lead 60 will return to its initial value in a similar step-like fashion when the temperature of disk 27 and thermistor 31 decreases to a point which produces a sensor signal which is insufficient to hold the transistor 53 in conduction. The specific temperature at which the output voltage assumes its initial value will depend upon the amount of hysteresis present in the Schmitt trigger circuit, but for all practical purposes the reset temperature can be considered to be the same as the tripping temperature.

The same switch setting used to sense the end of an extraction operation can be used to sense the end of a draining operation. As long as the water level within the tub 12 is sufficient to cover a substantial portion of disk 27 the temperature of thermistor 31 will not rise to a level which will operate the trigger circuit. However, once the water level has dropped below that of disk 27 its temperature will begin to rise and eventually the trigger circuit will respond to the resulting voltage and cause the output on lead 60 to change state. Once again, this step-like change in the voltage on lead 60 may be utilized to sequence the main washer control circuit to a different operating mode.

Depending upon the particular component values chosen and the thermal time constant of disk 27, the interval between the time at which washing fluid is removed from the surface of the disk and the time at which the disk attains a temperature which will actuate the trigger circuit may be adjusted as desired. Some delay in triggering is generally desirable when operating the sensor system 21 in the extraction or drain sensing mode to assure complete extraction or complete drainage of the area of tub 12 which is below the level of the sensor assembly 21. The configuration of member 27, the material used to construct same, and the specific placement of the heating and sensing components will be determined by the particular application in which the sensor system is being used.

Another important machine function which the instant system may be employed to sense is the termination of a cooldown operation, such as is generally used when laundering permanent press fabrics. The cooldown operation broadly comprises a subcycle in which the wash water is cooled below some predetermined temperature, such as 95°, before the tub is drained and an extraction operation is initiated. The amount of time and additional cold water required to reach the point at which a cooldown operation can be terminated varies widely and is dependent upon many variables such as water pressure, temperature of the cold water supply, and temperature of the hot water supply. The instant sensing system can be employed as a direct temperature sensor for the wash water, terminating the cooldown operation whenever the desired cooldown temperature is reached and thereby reducing the amount of time and water frequently wasted with cooldown cycles.

When operated as a direct temperature sensor, switches 41, 43, and 44 are open and switch 45 closed. This switch configuration disables the heater 30, removes thermistor 32 from the circuit, and places resistor 47 in series with thermistor 31 for biasing purposes. The temperature of disk 27 and therefore the temperature of thermistor 31 will now be determined only by the temperature of the water in the tub 12 and there will be little delay between the time at which the water reaches the desired cooldown temperature and the time at which the trigger circuit is actuated.

If desired, the same switch configuration used to sense cooldown may be utilized to sense the temperature of the water while the tub 12 is being filled and to modulate one of the electrically operated valves present in the water inlet 19 for controlling the temperature of the washing bath. Such temperature control of the washing bath may be particularly desirable when laundering delicate fabrics or other fabrics which are preferably laundered within specific temperature limitations.

The temperature at which the voltage developed on lead 33 will be sufficient (after amplification) to actuate the Schmitt trigger will depend upon the values of the various circuit components used as well as the value of the biasing resistor 46 or 47 used in any particular mode. By way of example, the following component values may be used to practice the invention: thermistors 31 and 32 may be GE 4R051; heater 30 may be 10W 1750 ohms; resistors 46, 47, 48, 51, 52, 55, 56, 57, 58 and 59 may be 390K, 470K, 10M, 4.7K, 120K, 330, 6.8K, 39K and 27K ohms respectively.

To vary the sense point voltage from sensing mode to sensing mode, it is necessary only to change the value of the thermistor biasing resistor. As will be appreciated by those skilled in the art, numerous additional switching configurations for such biasing resistors are possible. For example, rather than employing resistor 46 during both spin and drain sensing, an additional switch and resistor could be provided which would allow different sense point temperatures for the two sensing modes. Similarly, an additional switch and biasing resistor could be provided to allow different sense point temperatures between the cooldown sensing mode and the fill temperature sensing mode. Further, it will be appreciated that switches may be provided on the console of the appliance as at 15 which will allow the operator to modify or override the aforementioned switch configuration which is normally determined by the main control circuit 36. Numerous of such additions or modifications to the switching configuration illustrated may be made depending upon the application, such modifications being well within the skill of the art. It will thus be appreciated that the particular switch configuration illustrated in the preferred embodiment disclosed herein is merely representative of a variety of configurations falling within the scope of the invention.

The embodiments of the invention in which an exclusive property or privilege is claimed are defined as follows:

1. In an automatic washer having a clothes receiving chamber and indexable control means for sequencing the washer through a wash cycle, a sensing system comprising a first temperature responsive device, heating means, means placing said temperature responsive device and said heating means in good heat flow relationship with each other and with washing fluid in said washing chamber, a second temperature responsive device electrically connected in series with said first temperature responsive device, and switching means for selectively altering the energization of said heating means and the bias applied to said temperature responsive devices.

2. The sensing system of claim 1 further including circuit means for receiving the signal developed at the junction of said first and second temperature responsive devices and providing an indexing signal for said indexable control means in response to a predetermined received signal.

3. The sensing system of claim 2 wherein said circuit means comprises an amplifier circuit connected to said junction and a trigger circuit connected to said amplifier circuit for producing a step-like voltage change in response to a predetermined signal level at said junction.

4. The sensing system of claim 1 wherein said first and second temperature responsive devices are serially connected between first and second terminals of a power supply respectively, and wherein said switching means includes a first switch connecting said second temperature responsive device to said second power supply terminal, a second switch connected to the junction of said temperature responsive devices and operable to connect a resistance from said junction to said second power supply terminal, and a third switch connected in series with said heating means for controlling the power supplied thereto.

5. The sensing system of claim 4 wherein said heating means receives power from the 117 volt AC power line.

6. The sensing system of claim 5 wherein said heating means comprises a power resistor and said first and second temperature responsive devices comprise negative temperature coefficient thermistors.

7. The sensing system of claim 1 wherein said means for placing said temperature responsive device and said heating means in good heat flow relationship comprises a plate-like member, and said first temperature responsive device and said heating means are affixed to a first surface thereof.

8. The sensing system of claim 7 wherein said plate-like member comprises a ceramic disk located adjacent said clothes receiving chamber such that a second surface of said disk contacts washing fluid during selected portions of a wash cycle.

* * * * *